United States Patent
Shin et al.

(10) Patent No.: US 11,187,896 B2
(45) Date of Patent: Nov. 30, 2021

(54) IMAGE DISPLAY DEVICE CAPABLE OF MULTI-DEPTH EXPRESSION

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Bongsu Shin, Seoul (KR); Jesung Koh, Suwon-si (KR); Dongjin Kim, Suwon-si (KR); Geeyoung Sung, Daegu (KR); Hongseok Lee, Seoul (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 30 days.

(21) Appl. No.: 16/835,763

(22) Filed: Mar. 31, 2020

(65) Prior Publication Data

US 2021/0055546 A1 Feb. 25, 2021

(30) Foreign Application Priority Data

Aug. 22, 2019 (KR) ........................ 10-2019-0103305

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0187* (2013.01)

(58) Field of Classification Search
CPC ............ G02B 27/0093; G02B 27/0172; G02B 2027/0187; G02B 27/0176; G02B 2027/0178; G02B 2027/014; H04N 13/332
See application file for complete search history.

(56) References Cited

U.S. PATENT DOCUMENTS

| 9,052,506 B2 * | 6/2015 | Totani ................ G02B 27/0176 |
| 10,690,921 B1 * | 6/2020 | Ouderkirk .......... G02B 27/0176 |
| 2017/0212361 A1 | 7/2017 | Staton |
| 2018/0149142 A1 | 5/2018 | Bunting et al. |

FOREIGN PATENT DOCUMENTS

KR 10-2019-0032587 A 3/2019

* cited by examiner

*Primary Examiner* — Bryan Earles
(74) *Attorney, Agent, or Firm* — Sughrue Mion, PLLC

(57) ABSTRACT

An image display device includes a display device configured to modulate light to form an image, a light transmitting unit that transmits the image formed by the display device to eyes of a viewer and includes a focusing member, a driving unit that applies a driving force to a central position of the display device in a direction to change a distance between the display device and the light transmitting unit in the direction, a processor configured to control the display device, a connector disposed between one end of the display device and the processor, the connector connecting the display device to the processor, and a tilt prevention unit that applies an elastic force in the direction to the one end of the display device and to another end of the display device opposite to the one end.

20 Claims, 15 Drawing Sheets

(a)

(b)

(c)

IMAGE DISPLAY DEVICE CAPABLE OF MULTI-DEPTH EXPRESSION

CROSS-REFERENCE TO RELATED APPLICATION

This application is based on and claims priority under 35 U.S.C. § 119 to Korean Patent Application No. 10-2019-0103305, filed on Aug. 22, 2019, in the Korean Intellectual Property Office, the disclosure of which is incorporated by reference herein in its entirety.

BACKGROUND

1. Field

The present disclosure relates to image display apparatuses capable of expressing multiple depths.

2. Description of Related Art

A 3D image display technology has been applied to various fields, and recently, it has also been applied to image display devices related to virtual reality (VR) displays and augmented reality (AR) displays.

Head-mounted displays that offer virtual reality (VR) are now reaching the commercialization stage and are widely applied to and used in the entertainment industry. In addition, VR head-mounted displays are developing into a form capable of application to medical, education, and industrial fields.

An AR display, which is an advanced form of a VR display, is an imaging device that combines the real world with virtual reality, and has a feature to derive an interaction between reality and VR. The interaction between reality and VR is based on a function of providing information in real time about a real situation, and the experience of reality may be further enhanced by superimposing virtual objects or information on an environment of the real world.

In these devices, a stereoscopy technique is commonly used for three-dimensional (3D) image display. At this point, the alignment of a display and an optical system may be a problem in a process of changing a distance between the display and the optical system for multi-depth expression. Accordingly, studies have been conducted for finding a 3D image display method in which the alignment between the display and the optical system may be more precisely achieved.

SUMMARY

In accordance with an aspect of the disclosure, an image display device includes a display device configured to modulate light to form an image; a light transmitting unit configured to transmit the image formed by the display device to eyes of a viewer, the light transmitting unit comprising a focusing member; a driving unit configured to apply a driving force to a central position of the display device in a direction to change a distance between the display device and the light transmitting unit in the direction; a processor configured to control the display device; a connector disposed between one end of the display device and the processor, the connector connecting the display device to the processor; and a tilt prevention unit configured to apply an elastic force in the one direction to the one end of the display device and to another end of the display device opposite to the one end.

The image display device may further include a first support unit disposed facing the light transmitting unit and supporting the display device; and a second support unit separated in the direction from the first support unit with a predetermined interval therebetween, wherein the driving unit and the tilt prevention unit are disposed between the first support unit and the second support unit.

The tilt prevention unit may include an elastic body disposed between the first support unit and the second support unit, the elastic body being configured to apply a predetermined force to the first support unit and the second support unit to pull the first support unit and the second support unit closer to each other.

The elastic body may include a plate spring, wherein a first end of the plate spring is fixed to the first support unit and a second end of the plate spring is fixed to the second support unit.

The image display device may further include a stopper configured to limit a separation distance between the first support unit and the second support unit to greater than or equal to a minimum distance.

The stopper may extend in the direction and may be disposed between the first support unit and the second support unit.

The stopper may be fixed to one surface of the second support unit facing the first support unit and may include a stepped portion having a predetermined height in the direction.

The stopper may be disposed on a side surface unit disposed between the first support unit and the second support unit and may include a locking step extending in a second direction from the one end of the display device to the another end of the display device.

The stopper may include a plurality of stopper insertion holes, each stopper insertion hole from among the plurality of stopper insertion holes being disposed in a respective side surface unit from among a plurality of side surface units disposed between the first support unit and the second support unit; and a plurality of stopper insertion bodies configured to be replaceably disposed in the plurality of stopper insertion holes, each stopper insertion body from among the plurality of stopper insertion bodies comprising a locking step extending in a second direction from the one end of the display device to the another end of the display device, wherein each locking step from among the plurality of locking steps is positioned at a respective height in the direction that is different from the heights of each other locking step from among the plurality of locking steps.

The driving unit may include a driving force applying unit configured to apply the driving force to the display device; and a driving signal unit configured to apply a driving signal to the driving force applying unit.

The driving force applying unit may include a shape memory alloy or an electro active polymer.

The first support unit may include a first fixing unit configured to fix the driving force applying unit, and the second support unit may include a second fixing unit configured to fix the driving force applying unit.

In accordance with an aspect of the disclosure, an image displaying device includes a display device configured to modulate light to form an image; a light transmitting unit configured to transmit the image formed by the display device to eyes of a viewer, the light transmitting unit comprising a focusing member; a driving unit configured to apply a driving force in one direction over an entire width of the display device perpendicular to the one direction to change a distance between the display device and the light transmitting unit in the one direction; a processor configured to control the display device; and a connector disposed between one end of the display device and the processor, the connector connecting the display device to the processor.

The image display device may further include a first support unit disposed facing the light transmitting unit and supporting the display device; and a second support unit separated from the first support unit in the direction at a predetermined interval.

The driving unit may include a driving force applying unit configured to apply the driving force to the display device; and a driving signal unit configured to apply a driving signal to the driving force applying unit.

The driving force applying unit may include a shape memory alloy or an electro active polymer.

The driving signal unit may be configured to apply a first driving voltage to generate a first driving force by the driving force applying unit and a second driving voltage to generate a second driving force by the driving force applying unit.

The driving signal unit may be configured to apply the first driving force to move the first support unit and the second support unit closer to each other in the direction, and the driving signal unit may be configured to apply the second driving force to separate the first support unit and the second support unit from each other in the direction.

The first support unit may include a first fixing unit that fixes the driving force applying unit, and the second support unit may include a second fixing unit that fixes the driving force applying unit.

The image display device may further include a stopper configured to limit a separation distance between the first support unit and the second support unit to greater than or equal to a minimum distance.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
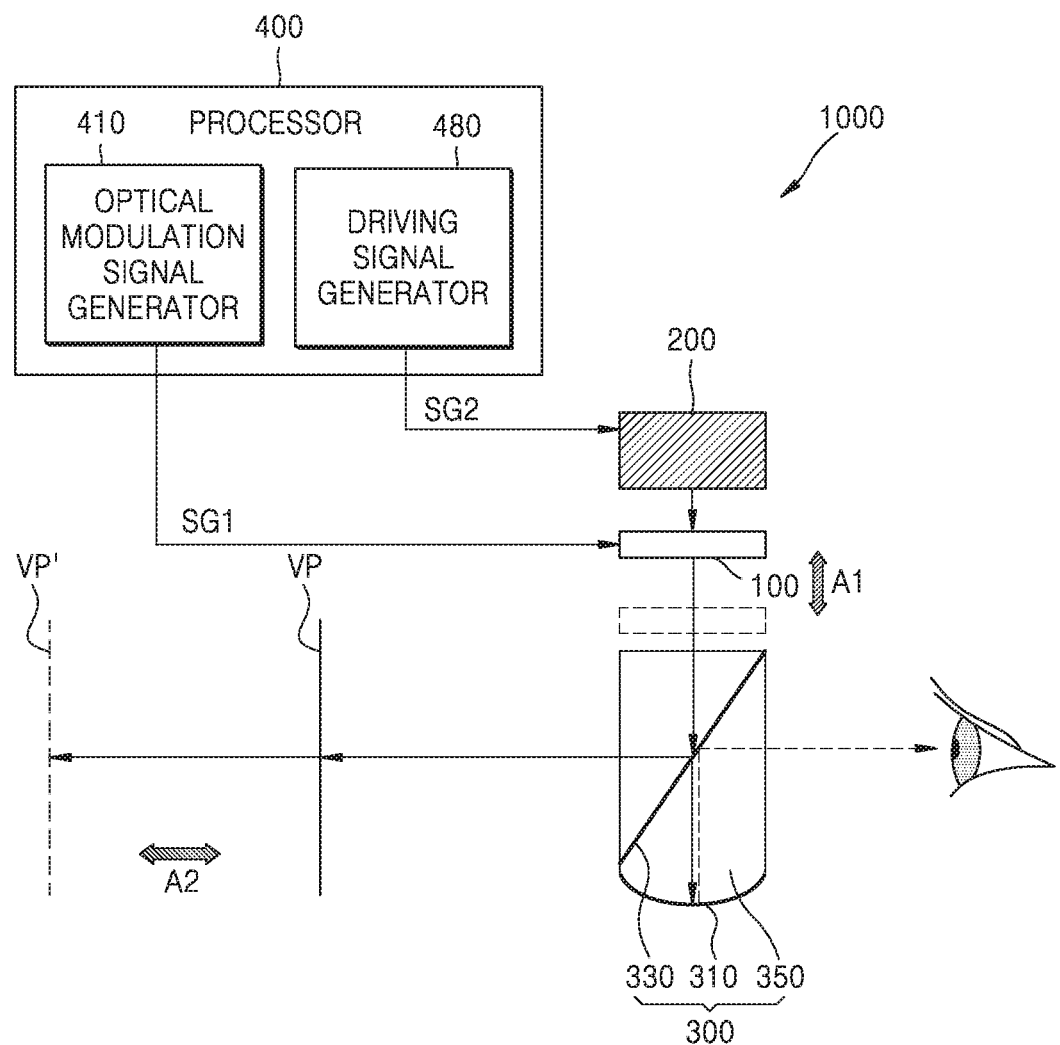
FIG. 1 is a diagram illustrating a configuration and an optical arrangement of an image display device according to an embodiment.

Hereinafter, embodiments of the present disclosure will be described in detail with reference to the accompanying drawings. In the drawings, like reference numerals refer to like elements throughout, and sizes of constituent elements may be exaggerated for clarity and convenience of explanation. Embodiments described below are merely illustrative, and various modifications may be possible from disclosed embodiments.

It will be understood that when an element or layer is referred to as being "on" or "above" another element or layer, the element or layer may be directly on another element or layer or there may be one or more intervening elements or layers.

As used herein, singular forms are intended to include plural forms as well, unless the context clearly indicates otherwise. It should be understood that, when a part "comprises" or "includes" an element in the specification, unless otherwise defined, the part does not exclude other elements but may further include other elements.

The term "above" and similar directional terms may be applied to both singular and plural.

The operations of all methods described herein may be performed in any suitable order unless otherwise indicated herein or otherwise clearly contradicted by context. It is not necessarily limited to the order of description of the operations. All examples or example terms ("for example", etc.) are simply used to explain in detail the technical scope of the disclosure, and thus, the scope of the disclosure is not necessarily limited by the examples or the example terms.

FIG. 1 is a diagram illustrating a configuration and an optical arrangement of an image display device 1000 according to an embodiment.

The image display device 1000 may include a display device 100 configured to modulate light to form an image, a driving unit 200 that drives the display device 100 so that the position of the display device 100 is changed, a light transmitting unit 300 that transmits the image formed in the display device 100 to the eyes of a viewer, and a processor 400 for controlling the display device 100 and the driving unit 200.

The display device 100 forms an image by modulating light according to image information with respect to an image to be provided to a viewer. An image formed by the display device 100 may be provided to both eyes of a viewer, and for convenience, only an optical system facing a single eye is depicted. An image formed by the display device 100 may be, for example, a stereo image provided to the left and right eyes of a viewer, a hologram image, a light field image, and an integral photography (IP) image, etc., and also may include images of a multi-view method or a super multi-view method. Also, the present disclosure is not limited thereto and the image formed by the display device 100 may be a general two-dimensional image.

The display device 100 may include, for example, a liquid crystal on silicon (LCoS) device, a liquid crystal display (LCD) device, an organic light emitting diode (OLED) display device, and a digital micromirror device (DMD), and also, may include next-generation display devices such as micro LEDs and quantum dot LEDs.

Although not shown in FIG. 1, the image display device 1000 may include a light source for forming an image on the display device 100, and besides the above, a beam splitter for controlling a light path, a relay lens for enlarging or reducing an image, and a spatial filter for removing noise may further be provided in the image display device 1000.

The light transmitting unit 300 changes a path of an image formed by the display device 100, and, after adjusting the size of the image to a size suitable for a viewer's field of vision, transmits the image to the viewer's eye. The light transmitting unit 300 may include a focusing member 310 and may include a beam splitter 330 as a member that changes a path of light by diverting the light.

The focusing member 310 may be an image forming member having refractive power and may enlarge or reduce an image formed by the display device 100. The focusing member 310 is depicted as a concave mirror, but is not limited thereto. The focusing member 310 may have a combined shape of a concave mirror, a convex lens, a concave lens, etc. besides the concave mirror shape.

The beam splitter 330 may include a half mirror that transmits half of incident light and reflects the other half. However, the present disclosure is not limited thereto, and the beam splitter 330 may include a polarizing beam splitter that transmits or reflects incident light according to polarization. When the beam splitter 330 includes a polarizing beam splitter, additional optical elements for polarization conversion may further be provided in the light transmitting unit 300.

As depicted in FIG. 1, the focusing member 310 and the beam splitter 330 are fixed through a transparent light guide member 350, and thus, the light transmitting unit 300 may have an integrated structure. However, this is an example and is not limited thereto.

The light transmitting unit 300 not only transmits light containing an image formed by the display device 100 to a viewer's eye, but also transmits light containing a real environment image in front of a viewer to the viewer's eye. Accordingly, the image display device 1000 may function as a see-through type display.

The light transmitting unit 300 is not limited to the depicted shape and configuration. An additional optical element may further be provided to transmit an image formed in the display device 100 to a viewer's eye together with a real environment image in front of the viewer, and optical windows having various shapes and structures may be employed.

Light of an image formed by the display device 100 reaches a viewer's eye via a path in which the light passes through the beam splitter 330, is reflected by the focusing member 310 and then is reflected again by the beam splitter 330. In this path, a viewer recognizes a virtual image formed in a virtual image plane VP at a predetermined position behind the beam splitter 330 as shown in FIG. 1, and a depth sensed by the viewer differs depending on the position of the virtual image plane VP.

The image display device 1000 according to an embodiment may change the position of the virtual image plane VP relative to the eyes of the viewer. To this end, the image display device 1000 includes the driving unit 200 for changing the position of the display device 100. The driving unit 200 may move the display device 100 in a direction parallel to the optical axis of light traveling between the display device 100 and the focusing member 310 so that a distance from the display device 100 to the focusing member 310 is changed. When the position of the display device 100 is changed in an A1 direction, the position of the virtual image plane VP is changed in an A2 direction as shown in FIG. 1.

The driving unit 200 employed in the image display device 1000 employs a shape-variable material in order to increase a position driving range of the display device 100 while maintaining a small volume. That is, the driving unit 200 may be deformed according to an applied signal and provide driving force to the display device 100. For the shape-variable material, the driving unit 200 may include a material of which a shape is changed by a predetermined condition.

The processor 400 may generate an optical modulation signal SG1 to be transmitted to the display device 100 and a driving signal SG2 to be transmitted to the driving unit 200 according to image information related to an image to be recognized by a viewer. The display device 100 and the driving unit 200 respectively are controlled by the generated optical modulation signal SG1 and the driving signal SG2. That is, an image is formed in the display device 100 by the optical modulation signal SG1, and the position of the display device 100 is changed by the driving signal SG2 so that a virtual image plane VP appropriately set for the image is located.

The processor 400 may include an optical modulation signal generator 410 and a driving signal generator 480. An optical modulation signal SG1 is generated by the optical modulation signal generator 410 and a driving signal SG2 is generated by the driving signal generator 480.

The image information includes pixel data related to color values of a plurality of pixels for each of a plurality of frames of images to be provided to a viewer, and, together with the pixel data, may also include depth information connected to the position of a virtual image plane VP, where each image is to be imaged.

The optical modulation signal generator 410 may generate a light modulation signal SG1 by converting an electrical signal by which a predetermined color value is implemented with reference to the pixel data included in the image information.

The driving signal generator 480 may generate a driving signal SG2 for moving the position of the display device 100 so that a virtual image plane VP is formed at a position corresponding to a set representative depth value with reference to depth information included in the image information.

The optical modulation signal SG1 and the driving signal SG2 respectively are transmitted to the display device 100 and the driving unit 200, and thus, a corresponding image may be recognized by a viewer from a changed position of a virtual image plane VP.

The driving signal SG2 for driving the driving unit 200 may be transmitted to be delayed by a predetermined time compared to the optical modulation signal SG1. The predetermined time may be set to be longer than a convergence-accommodation time of the viewer's eyes. This takes into account a time it takes for a human eye to recognize an image of the changed depth position. An example detailed configuration for varying the position of the display device 100 by driving of the driving unit 200 will be described below with reference to FIGS. 2 through 10.

Figure 2:
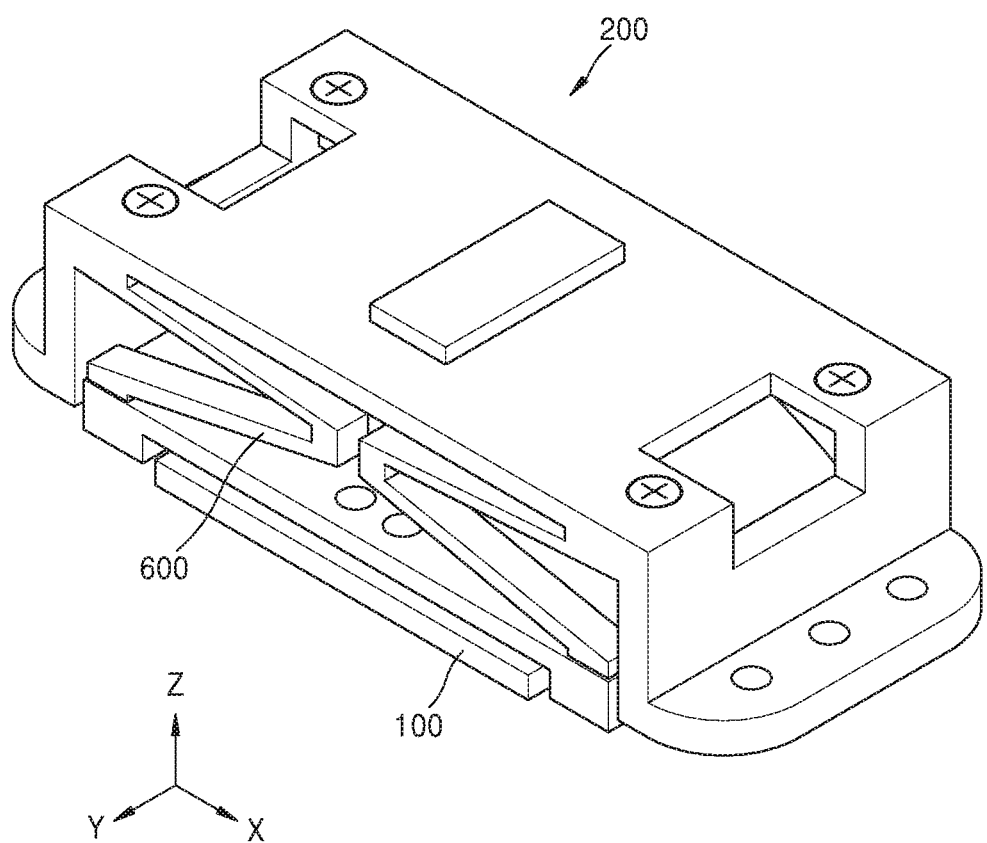
FIG. 2 is a perspective view of a display device, a driving unit, and a tilt prevention unit according to an embodiment.
Figure 3:
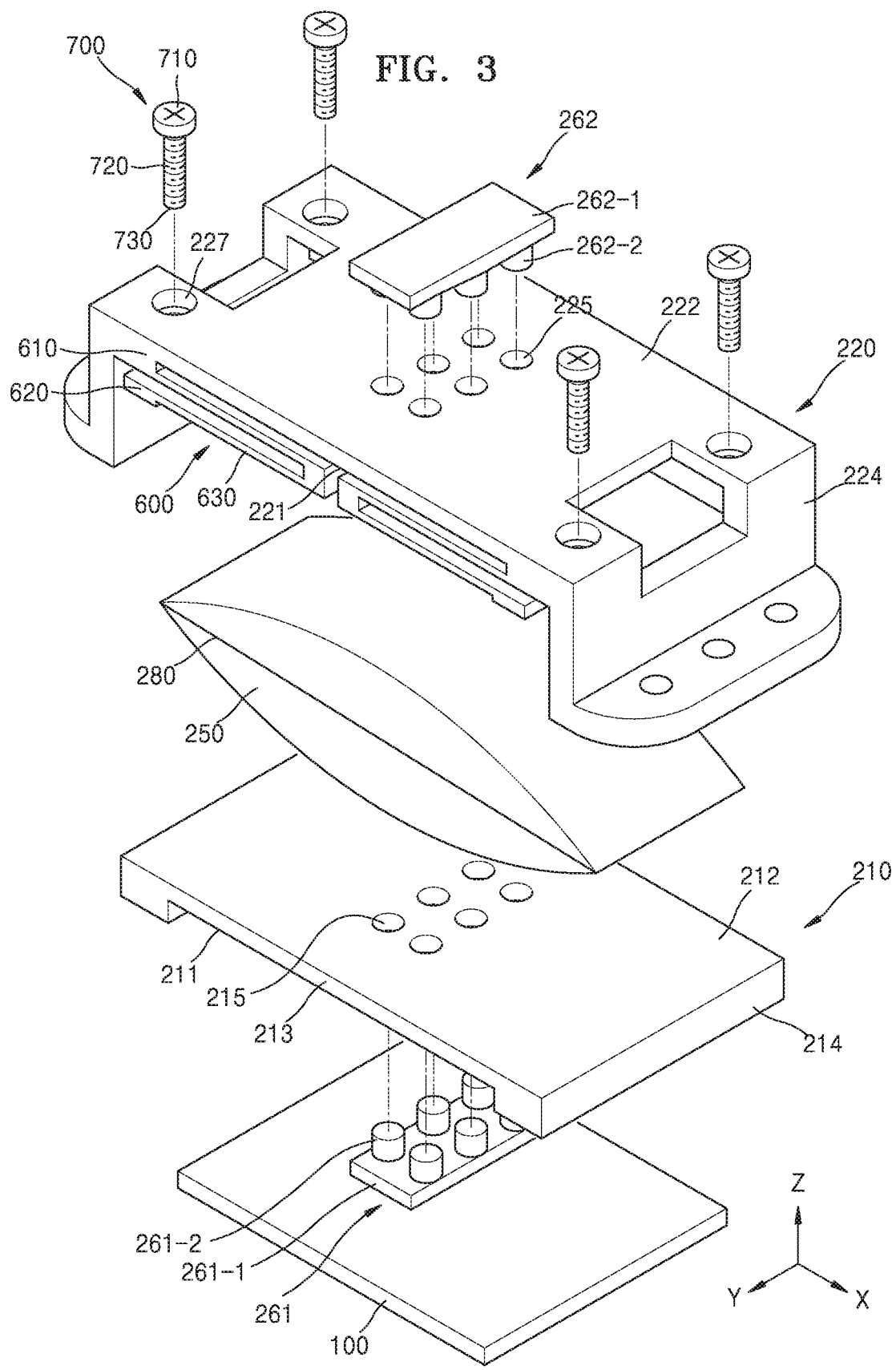
FIG. 3 is an exploded perspective view of the driving unit and the tilt prevention unit of FIG. 2.
Figure 4:
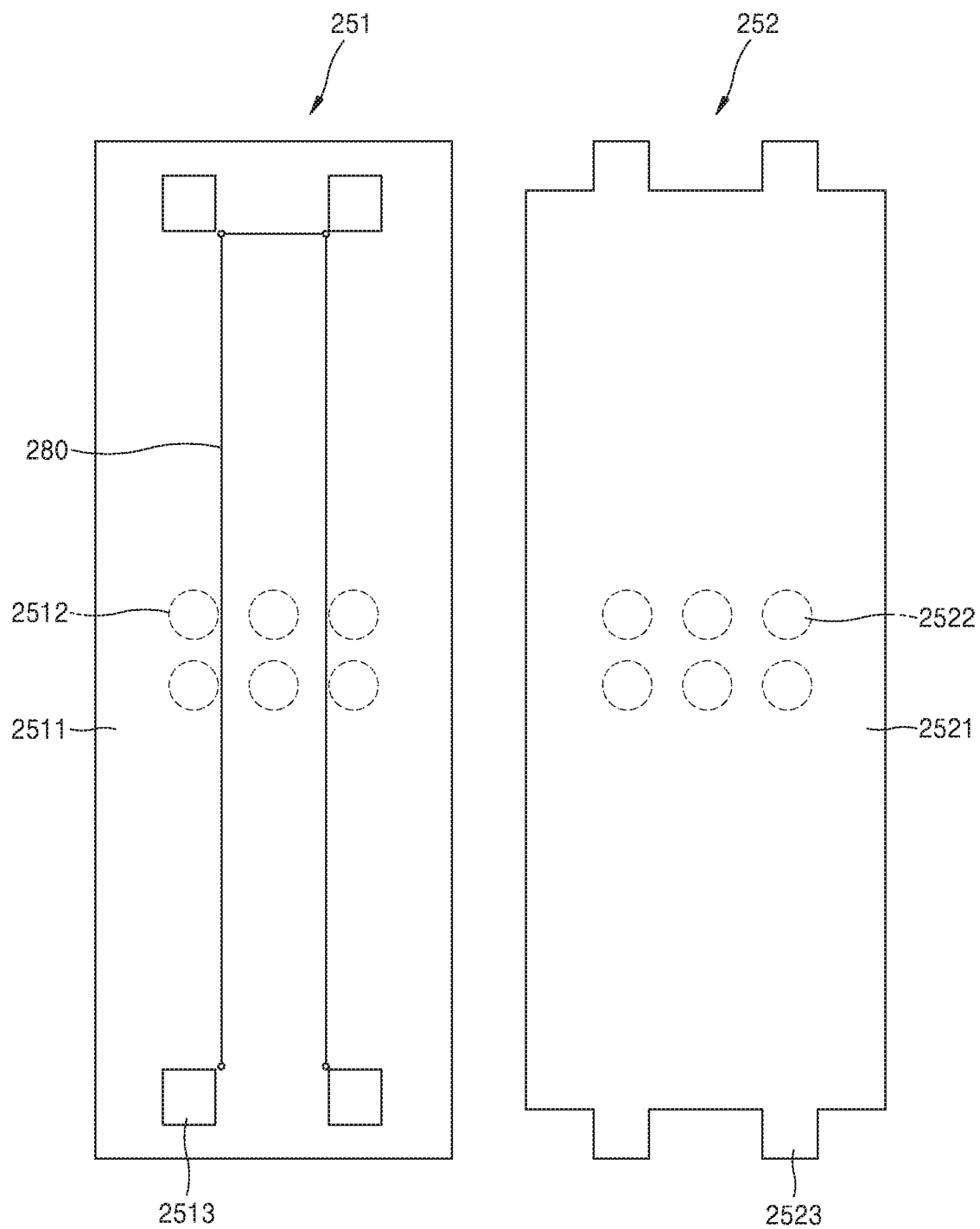
FIG. 4 is a plan view of a first shape variable body and a second shape variable body according to an embodiment.

FIG. 2 is a perspective view of the display device 100, the driving unit 200, and a tilt prevention unit 600 according to an example embodiment. FIG. 3 is an exploded perspective view of the driving unit 200 and the tilt prevention unit 600 of FIG. 2. FIG. 4 is a plan view of a first shape variable body and a second shape variable body according to an embodiment.

Referring to FIGS. 2 through 4, the driving unit 200 may include a first support unit 210 supporting the display device 100, a second support unit 220 facing the first support unit 210, a driving force applying unit 250 between the first support unit 210 and the second support unit 220, and a first fixing unit 261 and a second fixing unit 262 supporting the driving force applying unit 250.

The first support unit 210 may be provided in a flat panel shape extending along a plane to support the display device 100. As an example, the display device 100 may be disposed on a first surface 211 of the first support unit 210 that is disposed to face the light transmitting unit 300 illustrated in FIG. 1. In this case, on the first surface 211 of the first support unit 210, a side surface unit 214 extending in a direction (Z direction as shown in FIG. 3) and extending along a perimeter of the first support unit 210 may be disposed, and a mounting part 213 may include a groove shape formed by the side surface unit 214 to allow the display device 100 to be mounted. The driving force applying unit 250, which will be described later, may be supported on a second surface 212 of the first support unit 210 opposite to the first surface 211 of the first support unit 210. Also, first mounting grooves 215 for supporting the first fixing unit 261 may be disposed at the center of the first support unit 210. However, the disclosure is not limited thereto, and another configuration for supporting the first fixing unit 261 may be disposed.

The second support unit 220 may be provided in a flat panel shape extending along the same plane as that of the first support unit 210. As an example, a first surface 221 of the second support unit 220 may be disposed to face the second surface 212 of the first support unit 210, and accordingly, the driving force applying unit 250 may be disposed between the second surface 212 of the first support unit 210 and the first surface 221 of the second support unit 220. In this case, a side surface unit 224 extending in a direction (Z direction as shown in FIG. 3) and extending along a perimeter of the second support unit 220 may be disposed on the first surface 221 of the second support unit 220.

According to an embodiment, the side surface unit 224 of the second support unit 220 may be disposed to engage the side surface unit 214 of the first support unit 210. Accordingly, when the first support unit 210 moves in a direction (Z direction), the side surface unit 224 of the second support unit 220 may act as a guide for guiding the motion of the first support unit 210. For example, the second support unit 220 may be disposed to be separated from the first support unit 210 with a predetermined distance therebetween in a direction, for example, a moving direction (Z direction) of the display device 100. In this case, the second support unit 220 is disposed at a relatively fixed position with respect to the light transmitting unit 300, and the first support unit 210 that supports the display device 100 is supported by the second support unit 220 and moves along the side surface unit 224 of the second support unit 220. In addition, the side surface unit 224 of the second support unit 220 may function as an accommodating unit capable of accommodating the driving force applying unit 250. The second fixing unit 262, which will be described later, may be supported on a second surface 222 of the second support unit 220 opposite to the first surface 221 of the second support unit 220, and second mounting grooves 225 for supporting the second fixing unit 262 may be disposed at a central portion of the second support unit 220. However, the disclosure is not limited thereto, and another configuration for supporting the second fixing unit 262 may be provided.

The driving force applying unit 250 is disposed between the first support unit 210 and the second support unit 220 and may apply a driving force to the display device 100 via the first support unit 210 on which the display device 100 is supported along a direction (e.g., the Z direction). For example, the driving force applying unit 250 may be provided to have a predetermined thickness in a direction (Z direction). The predetermined thickness of the driving force applying unit 250 is increased or decreased by a driving force signal, and thereby the driving force applying unit 250 may apply a driving force to the first support unit 210 in one direction (Z direction). The driving force applying unit 250 according to an embodiment may include a material, such as a shape memory alloy (SMA) element or an electro active polymer, a shape of which is changed into a predetermined shape by a specific driving signal. In the present embodiment, an example of the driving force applying unit 250 is assumed and described as an SMA element, but the disclosure is not limited thereto.

The driving force applying unit 250 according to an embodiment may include an SMA element, and, in this case, the SMA element may be a member of which shrinkage deformation may be caused by heat. For example, the SMA element may include a nickel-titanium (Ni—Ti) alloy, a copper-zinc (Cu—Zn) alloy, a gold-cadmium (Au—Cd) alloy, an indium-titanium (In—Ti) alloy, etc. As an example, the driving force applying unit 250 may include detachable portions as shown in FIG. 4. For example, the driving force applying unit 250 may include a first driving force applying body 251 and a second driving force applying body 252 separated along a plane. The first driving force applying body 251 may include a first main body unit 2511 provided as an SMA element, first support grooves 2512 support by the first fixing unit 261, and coupling grooves 2513 to be coupled to protrusions 2523 of the second main body unit 2521. The second driving force applying body 252 may be disposed facing the first main body unit 2511 and may include a second main body unit 2521 including an SMA element, second support grooves 2522 supported by the second fixing unit 262, and coupling protrusions 2523 that couple the first driving force applying body 251 to the second driving force applying body 252 by coupling with the coupling grooves 2513.

A driving signal unit 280 may supply a driving voltage to the SMA element to cause shrinkage deformation. As an example, the driving signal unit 280 may be connected to the driving signal generator 480 shown in FIG. 1 to receive a driving signal. The driving signal unit 280 may supply a driving voltage for causing a shrinkage deformation of the SMA device by using a driving signal received from the driving signal generator 480. As an example, as shown in FIG. 4, the driving signal unit 280 may have a wire shape extending over an entire region of the first driving force applying body 251. As another example, the driving signal unit 280 may have a wire shape extending over a portion of the first driving force applying body 251. In this case, the driving force applying unit 250 may be shrinkage deformed by a driving voltage applied by the driving signal unit 280.

According to an embodiment, the temperature of the driving force applying unit 250 rises above a critical temperature in order to cause shrinkage deformation. For example, although the critical temperature is different depending on the SMA element, the critical temperature of the SMA element may be in a range from 43° C. to 45° C. The critical temperature is a temperature for causing shrinkage deformation of the SMA element, and may be referred to as a deformation temperature. As an example, the driving signal unit 280 may be operated such that, in order to offset a difference in response time in which the temperature changes to a deformation temperature from room temperature, a preheating voltage may be applied to an SMA element to reach a state immediately before (i.e., close to but less than) a critical temperature, that is, a preheating temperature before a driving signal is applied, and when a driving signal is input, the driving voltage may be applied to the driving signal unit 280.

Referring to FIG. 3 again, the first fixing unit 261 and the second fixing unit 262 include supporting members for fixing the position of the driving force applying unit 250 disposed between the first support unit 210 and the second support unit 220. As an example, the first fixing unit 261 may include a first base unit 261-1 having a flat panel shape and first protrusions 261-2 protruding in a direction (Z direction) from a surface of the first base unit 261-1. The second fixing unit 262 may include a second base unit 262-1 having a flat panel shape and second protrusions 262-2 protruding in a direction (Z direction) from a surface of the second base unit 262-1. As an example, the first protrusions 261-2 pass through the first mounting grooves 215 provided in the first support unit 210 and are coupled to the first support grooves 2512 provided in the first driving force applying body 251, and thus, the position of the first driving force applying body 251 with respect to the first support unit 210 may be fixed. In a similar manner, the second protrusions 262-2 are also coupled to the second support grooves 2522 provided in the second driving force applying body 252, and thus, the position of the second driving force applying body 252 with respect to the second support unit 220 may be fixed. Accordingly, the relative position of the driving force applying unit 250 with respect to the first support unit 210 and the second support unit 220 may be fixed.

The driving force applying unit 250 according to an embodiment may be positioned at central portions of the first support unit 210 and the second support unit 220. Because the image display device 1000 may be worn by a user, it is necessary that the image display device 1000 be light in weight. In order to reduce the weight of the image display device 1000, the first support unit 210 and the second support unit 220 may include a lightweight material, and also, the driving force applying unit 250 may be provided in a convex shape only in the central portions of the first support unit 210 and the second support unit 220 to be optimized for contraction and expansion in a thickness direction. In this case, one end of the display device 100 according to an embodiment may be connected to the processor 400 by using a connector 800 having rigidity (refer to FIG. 5A). When a vertical force is applied to the centers of the first support unit 210 and the second support unit 220 that are light in weight by using the driving force applying unit 250, due to the rigidity of the connector 800 connected to one end of the display device 100, one end of the first support unit 210 may move in a direction (Z direction) less than the other end of the first support unit 210. This may cause the first support unit 210 to be tilted about the Y-axis direction, and the display device 100 supported by the first support unit 210 may also be tilted. When a relative position of the display device 100 and the light transmitting unit 300 is changed by tilting the display device 100, an image may be undesirably blurred.

The image display device 1000 according to an embodiment may further include a tilt prevention unit 600 and stoppers 700. The tilt prevention unit 600 applies a predetermined force to the first support unit 210 and the second support unit 220 in a direction to prevent tilting of the first support unit 210 as described above.

The tilt prevention unit 600 may apply a predetermined force for fixing a relative position of the first support unit 210 and the second support unit 220 by being disposed between the first support unit 210 and the second support unit 220. As an example, one end 610 of the tilt prevention unit 600 is fixed on a first surface 221 of the second support unit 220, the other end 620 of the tilt prevention unit 600 is fixed on a second surface 212 of the first support unit 210, and an elastic body 630 that may apply a pre-tensile force may be included between the one end 610 and the other end 620 of the tilt prevention unit 600. For example, the tilt prevention unit 600 may be implemented as a plate spring, the one end 610 and the other end 620 of which are fixed on the first support unit 210 and the second support unit 220, respectively. As an example, in order to achieve a balance of forces at both ends (e.g., at both ends in the X direction) of the first support unit 210 and the second support unit 220, the tilt prevention part 600 may be disposed on the both ends, for example, in four corners of the first support unit 210 and the second support unit 220. However, the disclosure is not limited thereto, that is, another member capable of applying a predetermined restoring force between the first support unit 210 and the second support unit 220 and capable of achieving a balance of forces over an entire area of the first support unit 210 and the second support unit 220 may be disposed at different positions.

The stoppers 700 are limiting members that limit a separation distance between the first support unit 210 and the second support unit 220 so that the first support unit 210 and the second support unit 220 are not separated below a predetermined range (i.e., by less than a minimum distance). As an example, the stoppers 700 are disposed between the first support unit 210 and the second support unit 220 and may regulate a moving range of the first support unit 210 so that the first support unit 210 does not ascend above a predetermined interval in a direction (Z direction) with respect to the second support unit 220.

As an example, the stoppers 700 may extend in a direction and may be stopper screws disposed between the first support unit 210 and the second support unit 220. Each of the stoppers 700 according to an embodiment may include one end 710 that is supported by and that may contact the second support unit 220, an interval control unit 720 disposed between the first support unit 210 and the second support unit 220 by passing through a second mounting groove 227 disposed in the second support unit 220 and the other end 730 that is supported by and that may contact the second surface 212 of the first support unit 210. When the stopper 700 is implemented with a stopper screw, a length of the interval control unit 720 in a direction (Z direction) may be controlled according to a limiting range of a separation distance between the first support unit 210 and the second support unit 220. Hereinafter, a method of operating the tilt prevention unit 600 and the stopper 700 when the position of the first support unit 210 with respect to the second support unit 220 is changed by using the driving force applying unit 250 will be described in detail.

Figure 5A:
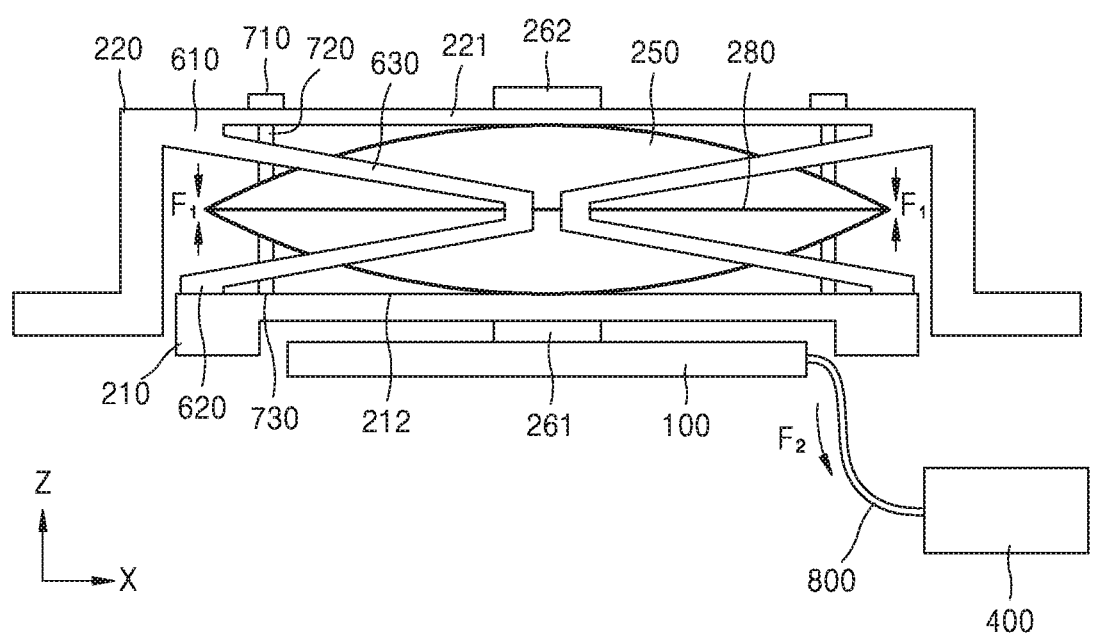
FIG. 5A is a side view of a driving unit, a tilt prevention unit, and a display device in a state before a driving force is transmitted by a driving force applying unit, according to an embodiment.
Figure 5B:
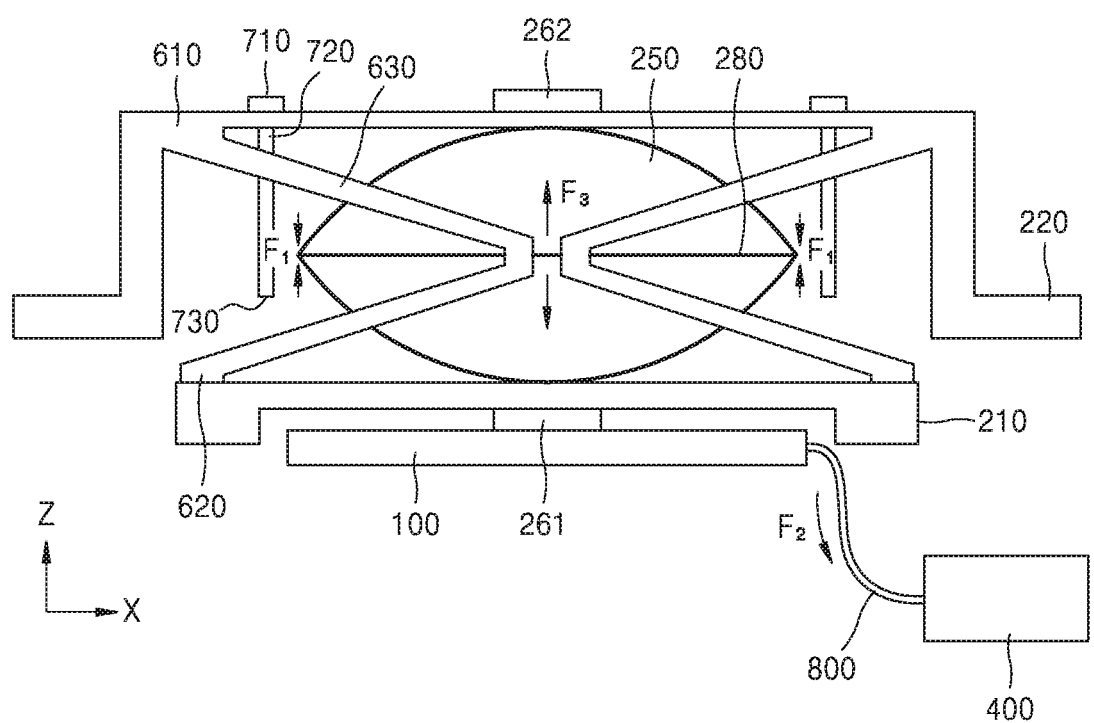
FIG. 5B is a side view of a driving unit, a tilt prevention unit, and a display device in a state after a driving force is transmitted by a driving force applying unit, according to an embodiment.

FIG. 5A is a side view of the driving unit 200, the tilt prevention unit 600, and the display device 100 in a state that a driving force is not transmitted by the driving force applying unit 250 (e.g., before the driving force is transmitted), according to an embodiment. FIG. 5B is a side view of the driving unit 200, the tilt prevention unit 600, and the display device 100 in a state after a driving force is transmitted by the driving force applying unit 250, according to an embodiment.

Referring to FIG. 5A, when a driving force generated by the driving force applying unit 250 according to an embodiment is not transmitted to the first support unit 210 and the second support unit 220, a predetermined tilting force $F_2$ that tilts an end of the display device 100 may be applied by the connector 800 connected to an end of the display device 100. At this point, the tilt prevention unit 600 may apply a compressive force $F_1$ to the first support unit 210 and the second support unit 220 that support the display device 100. In other words, the tilt prevention unit 600 may apply a force $F_1$ to the first support unit 210 and the second support unit 220 to pull the first support unit 210 and the second support unit 220 closer to each other. For example, since one end 610 of the tilt prevention unit 600 is disposed to be fixed on the first surface 221 of the second support unit 220, and the other end 620 thereof is disposed to be fixed on the second surface 212 of the first support unit 210, the elastic body 630 disposed between the one end 610 and the other end 620 may generate a compressive force $F_1$ to act upon the driving force applying unit 250 by way of the first support unit 210 and the second support unit 220. In other words, the elastic body 630 may exert an upward force in the Z direction upon the first support unit 210 and a downward force in the Z direction upon the second support unit 220. In this case, the elastic body 630 may have an elastic force greater than the tilting force $F_2$ that is applied to an end of the display device 100 by the connector 800 to tilt the display device 100. Accordingly, a separation distance in a direction (Z direction) between the first support unit 210 and the second support unit 220 may be maintained constant over an entire area of the first support unit 210 and the second support unit 220, and a tilting phenomenon of the display device 100 supported by the first support unit 210 may also be prevented.

As described above, when the compressive force $F_1$ is applied to the first support unit 210 and the second support unit 220 by the tilt prevention unit 600, a separation distance between the first support unit 210 and the second support unit 220 may be excessively reduced. In this case, the one end 710 of the stopper 700 is supported on the first surface 221 of the second support unit 220, and the other end 730 is supported on the second surface 212 of the first support unit 210, and thus, the separation distance between the first support unit 210 and the second support unit 220 may be controlled not to be reduced within a limiting range by the interval control unit 720. In other words, the separation distance between the first support unit 210 and the second support unit 220 may be controlled by the stopper 700 so as not to be reduced below a minimum distance. At this point, the separation distance between the first support unit 210 and the second support unit 220 by using the interval control unit 720 is not fixed, and the separation distance between the first support unit 210 and the second support unit 220 may also be controlled according to a necessary separation distance between the display device 100 and the light transmitting unit 300, for example, by controlling a length of the interval control unit 720 implemented as a screw type.

Referring to FIG. 5B, according to an embodiment, when a driving signal is generated by the driving signal generator 480 and a driving voltage is applied by the driving signal unit 280, the shape of the driving force applying unit 250 may be changed. As an example, when a driving voltage is applied to the driving force applying unit 250, a thickness of a central portion of the driving force applying unit 250 may increase, and accordingly, a driving force $F_3$ may be applied to the first support unit 210 and the second support unit 220, and thus, the separation distance between the first support unit 210 and the second support unit 220 may be increased. In this case, the other end 730 of the stopper 700 may be separated from the second surface 212 of the first support unit 210 as the first support unit 210 moves away from the second support unit 220.

When the separation distance between the first support unit 210 and the second support unit 220 is increased, the position between the connector 800 formed of a rigid material and the display device 100 may also be changed, and accordingly, a predetermined tilting force $F_2$ for tilting one end of the display device 100 may also be increased. In this case, a compressive force $F_1$ of the tilt prevention unit 600 may also increase by an amount proportional to the amount by which the separation distance between the first support unit 210 and the second support unit 220 is increased. Accordingly, the tilt prevention unit 600 may apply an increased compressive force $F_1$ to the first support unit 210 that supports the display device 100 and the second support unit 220. In this case, the elastic body 630 may have a compressive force $F_1$ greater than the tilting force $F_2$ for tilting the display device 100 by being applied to an end of the display device 100 by the connector 800. However, in this case, the compressive force $F_1$ applied by the tilt prevention unit 600 may also be less than a driving force $F_3$ applied by the driving force applying unit 250. Accordingly, the separation distance between the first support unit 210 and the second support unit 220 in a direction (Z direction) may be increased in a direction (Z direction) over the entire area of the first support unit 210 and the second support unit 220, and a tilting phenomenon of the display device 100 supported by the first support unit 210 may also be prevented.

Figure 6A:
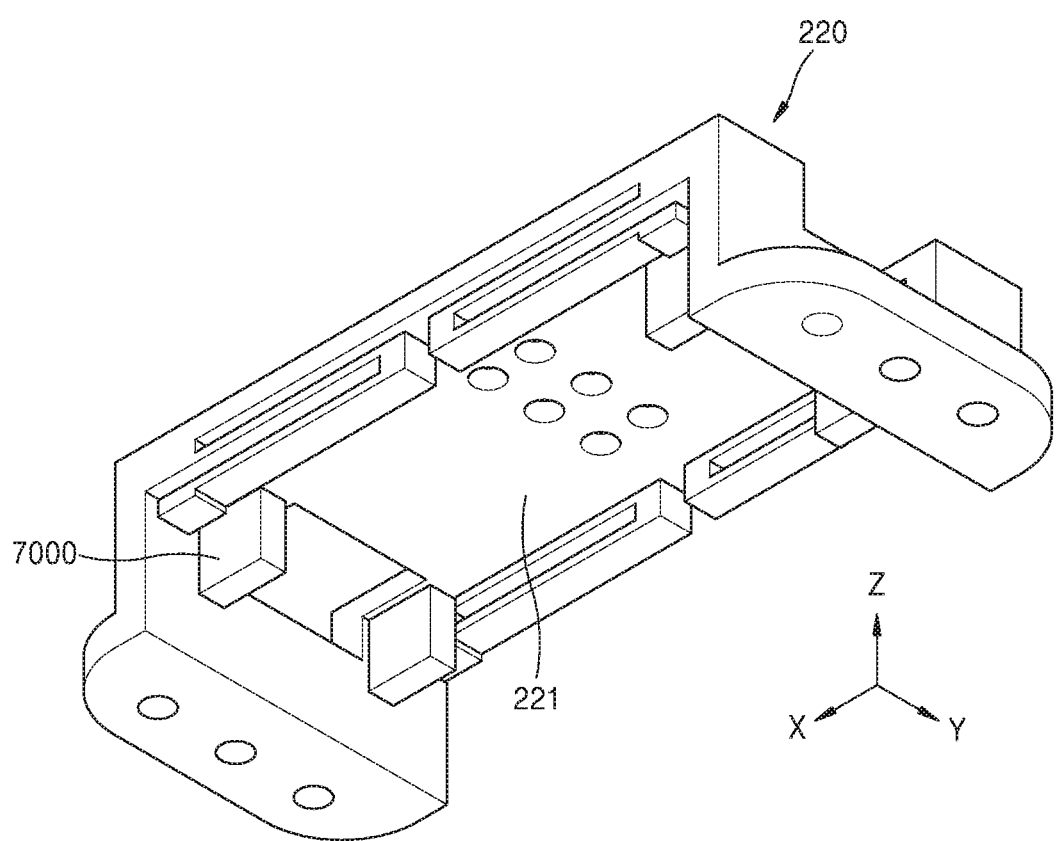
FIG. 6A is a side view of a second support unit and a tilt prevention unit according to an embodiment.
Figure 6B:
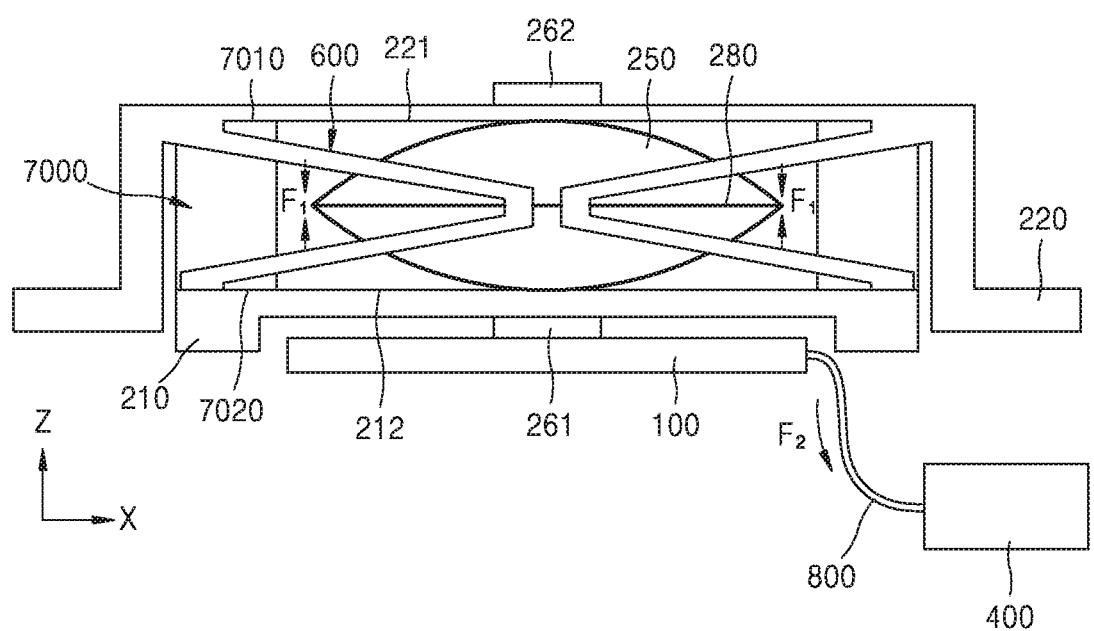
FIG. 6B is a side view of a driving unit, a tilt prevention unit, and a display device in a state before a driving force is transmitted by a driving force applying unit, according to another embodiment.
Figure 7A:
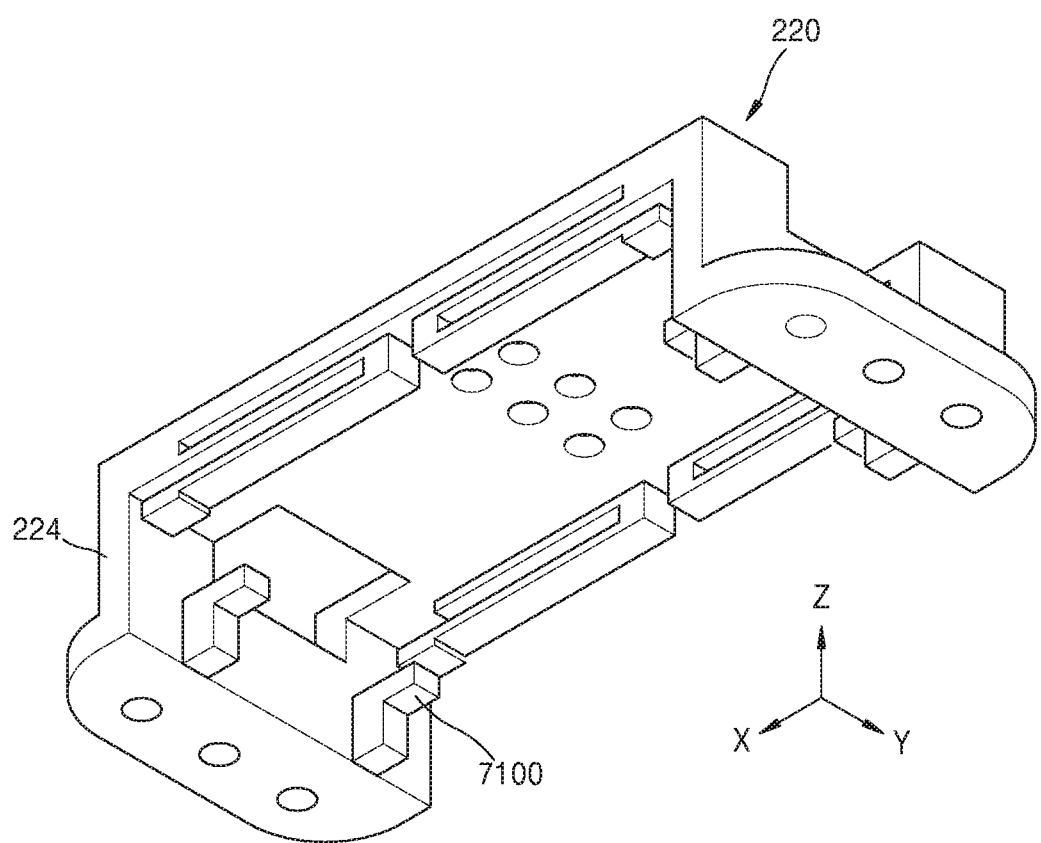
FIG. 7A is a side view of a second support unit and a tilt prevention unit according to an embodiment.
Figure 7B:
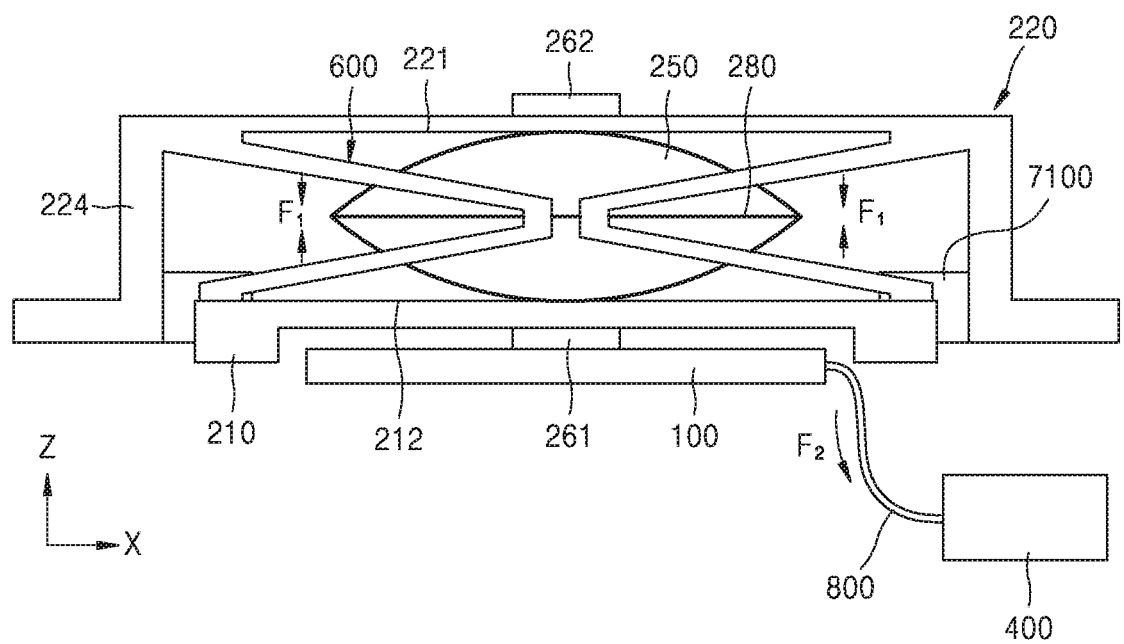
FIG. 7B is a side view of a driving unit, a tilt prevention unit, and a display device in a state before a driving force is transmitted by a driving force applying unit, according to an embodiment.
Figure 8A:
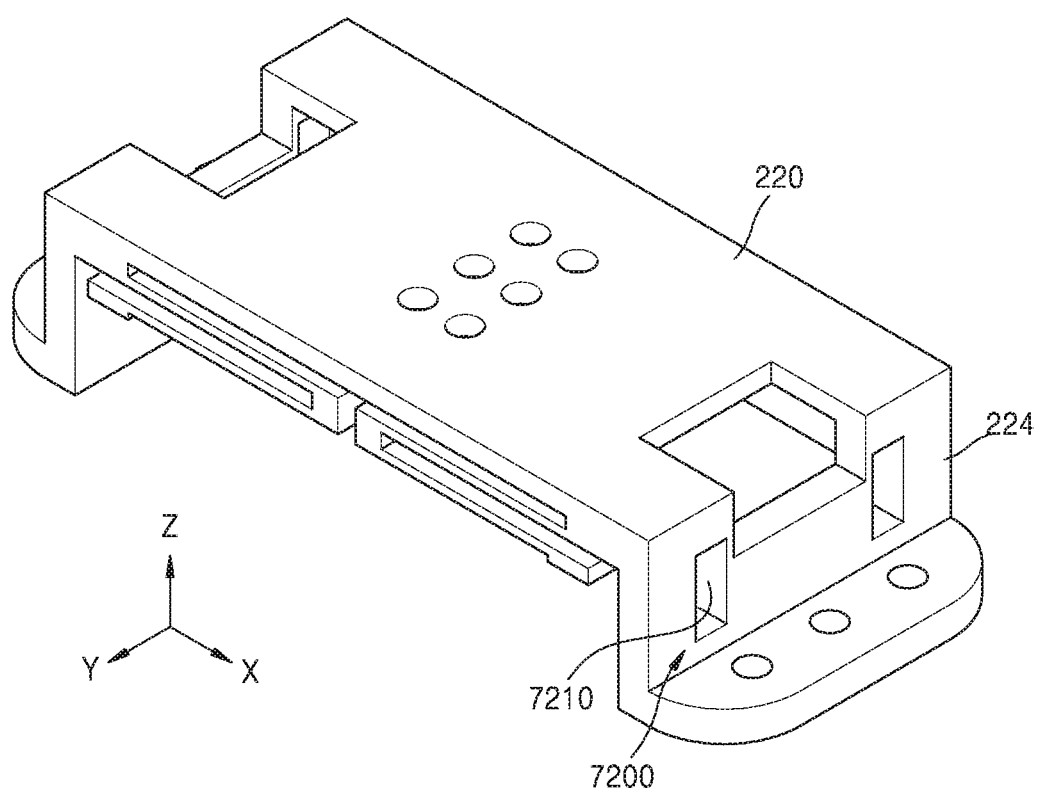
FIG. 8A is a side view of a second support unit and a tilt prevention unit according to an embodiment.
Figure 8B:
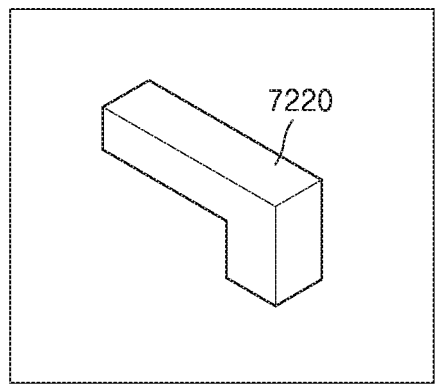
FIG. 8B is a perspective view of a stopper regulation unit according to an embodiment.
Figure 8B:
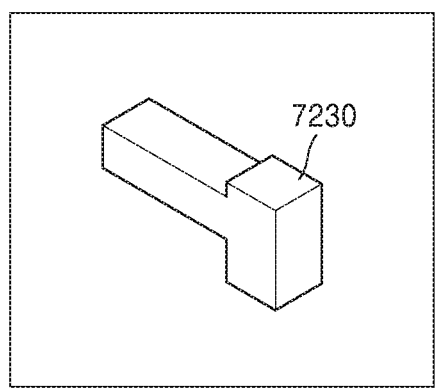
Figure 8B:
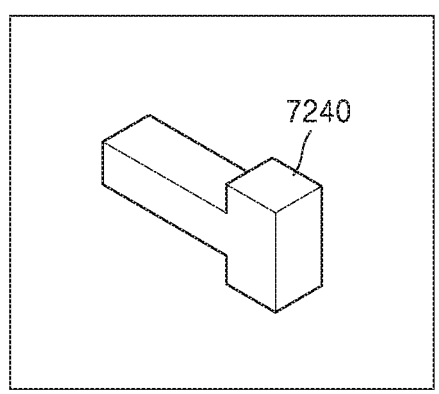
Figure 8C:
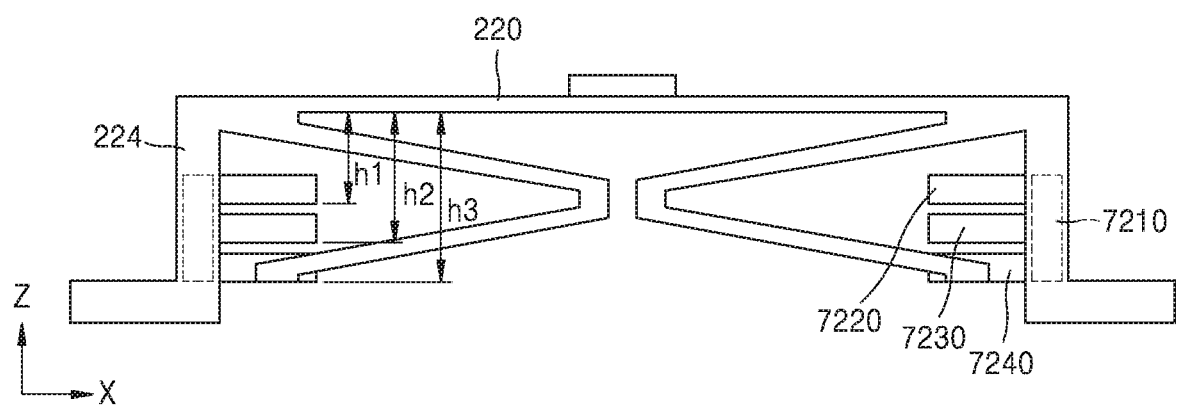
FIG. 8C is a side view of a second support unit and a tilt prevention unit according to an embodiment.

FIG. 6A is a perspective view of a second support unit 220 and a tilt prevention unit according to an embodiment. FIG. 6B is a side view of a driving unit, a tilt prevention unit, and a display device in a state before a driving force is transmitted by a driving force applying unit, according to an embodiment. FIG. 7A is a perspective view of a second support unit and a tilt prevention unit according to an embodiment. FIG. 7B is a side view of a driving unit, a tilt prevention unit, and a display device in a state before a driving force is transmitted by a driving force applying unit according to an embodiment. FIG. 8A is a perspective view of a second support unit and a tilt prevention unit according to an embodiment. FIG. 8B is a perspective view of a stopper regulation unit according to an embodiment. FIG. 8C is a side view of a second support unit and a tilt prevention unit according to an embodiment.

As described above, when the compressive force $F_1$ is applied to the first support unit 210 and the second support unit 220 by the tilt prevention unit 600, a separation distance between the first support unit 210 and the second support unit 220 may be excessively reduced. In this case, a stopper 700 may restrict the separation distance between the first support unit 210 and the second support unit 220 not to be reduced within a limiting range. In FIGS. 6A through 8B, stoppers 700 having a shape other than the stopper screw will be described. Other configurations and the movement state of the driving unit, the tilting prevention unit, and the display device after a driving force is transmitted by the driving force application unit are similar to the descriptions made with reference to FIGS. 5A and 5B, and thus, the descriptions thereof will be omitted for convenience of explanation.

Referring to FIGS. 6A and 6B, a stopper 7000 according to an embodiment may be provided in a stepped shape. As an example, the stopper 7000 may be provided in a stepped shape extending in a direction (Z direction) and may be disposed on the first surface 221 of the second support unit 220. At this point, the stopper 7000 may be disposed at four corner portions, for example, at both ends of the first support unit 210 and the second support unit 220 to limit a separation distance between them.

According to an embodiment, referring to FIG. 6B, when a driving force by the driving force applying unit 250 is not transmitted, one end 7010 of the stopper 7000 is supported on the first surface 221 of the second support unit 220, the other end 7020 of the stopper 7000 may be supported by the second surface 212 of the first support unit 210, and accordingly, even when a compressive force $F_1$ is applied by the tilting prevention unit 600, the separation distance between the first support unit 210 and the second support unit 220 may be maintained at a height of the stopper 7000.

Referring to FIGS. 7A and 7B, a stopper 7100 according to an embodiment may be provided in a shape of a locking step. As an example, the stopper 7100 may be provided in the shape of a locking step extending in a direction (X direction) and may be disposed on an inner surface of a side surface unit 224 disposed between the first support unit 210 and the second support unit 220. In this case, the stopper 7100 may be disposed on the four side surface units 224 so as to limit the separation distance between the first support unit 210 and the second support unit 220.

According to an example, referring to FIG. 7B, when a driving force is not transmitted by the driving force applying unit 250, the stopper 7100 may support a second surface 212 of the first support unit 210, and thus, even when a compressive force $F_1$ is applied by the tilting prevention unit 600, the separation distance between the first support unit 210 and the second support unit 220 may be maintained at the height of the stopper 7100.

Referring to FIGS. 8A through 8C, a stopper 7200 according to an embodiment may be provided in a shape of a locking step. As an example, the stopper 7200 may include stopper insertion units (i.e., stopper insertion holes) 7210 arranged on the four side surface units 224 disposed between the first support unit 210 and the second support unit 220. First through third stopper insertion bodies 7220 through 7240 may be inserted into the stopper insertion units 7210. In this case, the stopper insertion units 7210 may be disposed on the four side surface units 224 so as to limit the separation distance over the entire area of the first support unit 210 and the second support unit 220. In addition, the first through third stopper insertion bodies 7220 through 7240 inserted into the stopper insertion units 7210 may include locking steps having heights different from one another so as to adjust a regulation distance between the first support unit 210 and the second support unit 220 in a direction (Z direction). For example, when the first stopper insertion body 7220 is inserted into the stopper insertion unit 7210, the locking step may be disposed at a first height h1, and a distance between the first support unit 210 and the second support unit 220 may be regulated by the locking step disposed at the first height h1. In order to increase the regulation distance between the first support unit 210 and the second support unit 220, the second stopper insertion body 7230 may be disposed in the stopper insertion unit 7210. Accordingly, a distance between the first support unit 210 and the second support unit 220 may be regulated by the locking step disposed at a second height $h_2$. In the case of using the third stopper insertion body 7240, a distance between the first support unit 210 and the second support unit 220 may be regulated by a locking step disposed at a third height $h_3$.

As described above, various types of stoppers 700 may be used for the image display device 1000. However, when the stopper 700 is separately disposed, design difficulties may occur. The stopper 700 may instead be replaced by increasing a support area of the driving force applying unit 250. Hereinafter, the image display device 1000 in which the stopper 700 is replaced by increasing a support area of the driving force applying unit 250 will be described.

Figure 9:
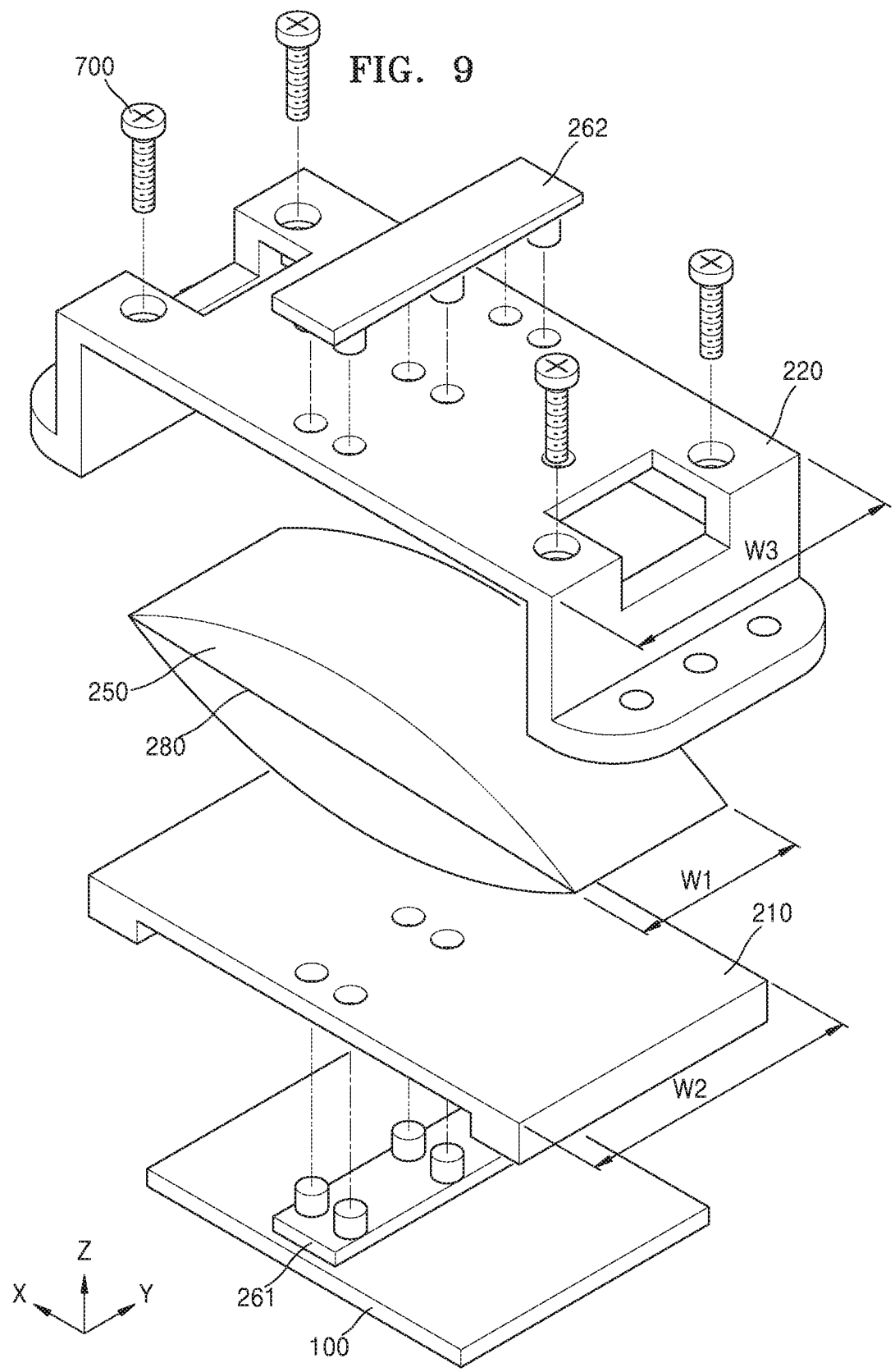
FIG. 9 is an exploded perspective view of a driving unit, a tilt prevention unit, and a display device according to an embodiment.
Figure 10:
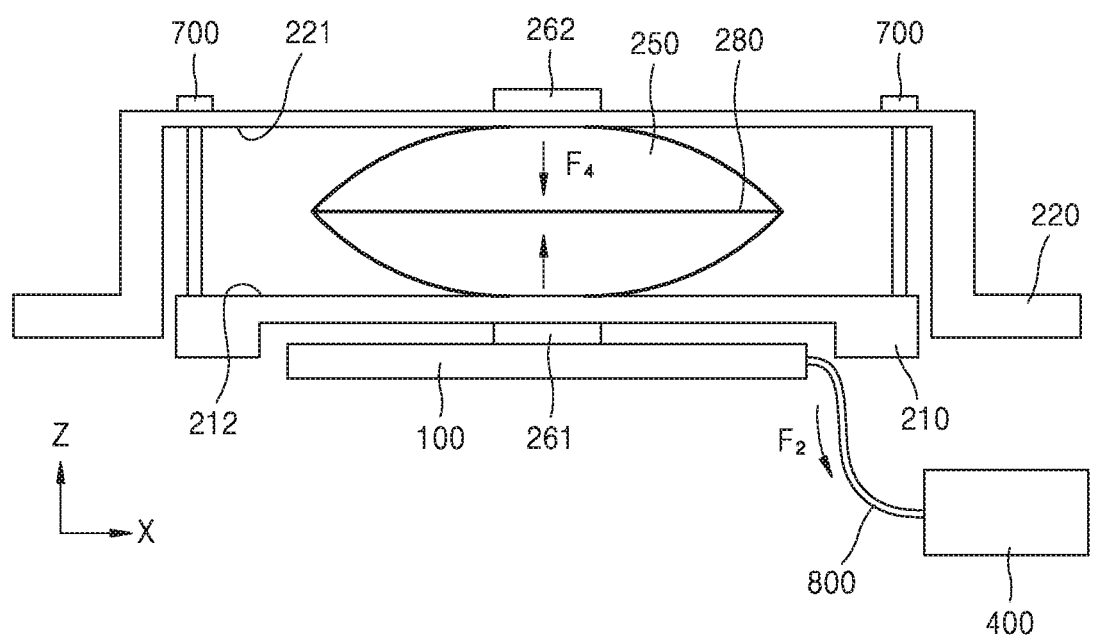
FIG. 10 is a side view of a driving unit, a tilt protection unit, and a display device according to an embodiment.

FIG. 9 is an exploded perspective view of a driving unit, a tilting prevention unit 600, and a display device 100 according to an embodiment. FIG. 10 is a side view of the driving unit, the tilting protection unit 600, and the display device 100 according to an embodiment.

Descriptions related to the display device 100, the first support unit 210, the second support unit 220, and the tilting prevention unit 600 are substantially the same as the descriptions given with reference to FIGS. 2 through 4, and thus, the descriptions thereof will be omitted for convenience of explanation.

Referring to FIGS. 9 and 10, a driving force applying unit 250 according to an embodiment is disposed between the first support unit 210 and the second support unit 220, and at this time, a width W1 of the driving force applying unit 250 may be formed substantially the same as a width W2 of a second surface 212 of the first support unit 210 and a width W3 of the first surface 221 of the second support unit 220. At this time, the driving force applying unit 250 may be fixed between the first support unit 210 and the second support unit 220 by a first fixing unit 261 disposed below the first support unit 210 in the Z direction and a second fixing unit 262 disposed above the second support unit 220 in the Z direction.

According to an embodiment, in an initial state, the driving signal unit 280 may transmit a first driving voltage to the driving force applying unit 250, and thus, a first driving force $F_4$ may be applied to the driving force applying unit 250. In this case, the width W1 of the driving force applying unit 250 may be formed substantially the same as the width W2 of the second surface 212 of the first support unit 210 and the width W3 of the first surface 221 of the second support unit 220. Accordingly, the driving force applying unit 250 may support the first support unit 210 and the second support unit 220 in an overall width direction (Y direction) of the display device 100, and more specifically, in the overall width direction (Y direction) of the first support unit 210 and the second support unit 220, and thus, the tilting of the display device 100 may be prevented by a first driving force $F_4$ applied by the driving force applying unit 250. In this case, a separation distance between the first support unit 210 and the second support unit 220 may be regulated by the stopper 700 so that the distance between the first support unit 210 and the second support unit 220 is not close to each other in a predetermined range or less (i.e., is not reduced below a minimum distance).

Also, in order to increase a separation distance between the first support unit 210 and the second support unit 220, the driving signal unit 280 may transmit a second driving voltage to the driving force applying unit 250, and at this point, a second driving force corresponding to an expansion force, not a compressive force, may be applied to the driving force applying unit 250. Accordingly, the separation distance between the first support unit 210 and the second support unit 220 may be increased and the driving force applying unit 250 may be supported over an area of at least ⅔ of the second surface 212 of the first support unit 210 and the first surface 221 of the second support unit 220, and thus, the tilting of the display device 100 may be prevented by the driving force applying unit 250.

According to the image display device according to an embodiment, the positional relationship between a display and an optical system may be precisely controlled. The image display device according to an embodiment may provide a display device in which a focal length is continuously changed. The image display device according to an embodiment may be easily applied to a wearable device, and may be applied to, for example, an eyeglass-type augmented reality display device. Up to this point, embodiments have been described with reference to accompanying drawings to facilitate understanding of the disclosure. However, it should be understood that embodiments described herein should be considered in a descriptive sense only and not for purposes of limitation. Also, it should be understood that the disclosure is not limited to the embodiments described above. This is because various changes in form and details may be made by those of ordinary skill in the art.

What is claimed is:

1. An image display device comprising:
   a display device configured to modulate light to form an image;
   a light transmitting unit configured to transmit the image formed by the display device to eyes of a viewer, the light transmitting unit comprising a focusing member;
   a driving unit configured to apply a driving force to a central position of the display device in a direction to change a distance between the display device and the light transmitting unit in the direction;
   a processor configured to control the display device;
   a connector disposed between one end of the display device and the processor, the connector connecting the display device to the processor; and
   a tilt prevention unit configured to apply an elastic force in the direction to the one end of the display device and to another end of the display device opposite to the one end.

2. The image display device of claim 1, further comprising:
   a first support unit disposed facing the light transmitting unit and supporting the display device; and
   a second support unit separated in the direction from the first support unit with a predetermined interval therebetween,
   wherein the driving unit and the tilt prevention unit are disposed between the first support unit and the second support unit.

3. The image display device of claim 2, wherein the tilt prevention unit comprises an elastic body disposed between the first support unit and the second support unit, the elastic body being configured to apply a predetermined force to the first support unit and the second support unit to pull the first support unit and the second support unit closer to each other.

4. The image display device of claim 3, wherein the elastic body comprises a plate spring, wherein a first end of the plate spring is fixed to the first support unit and a second end of the plate spring is fixed to the second support unit.

5. The image display device of claim 2, further comprising:
   a stopper configured to limit a separation distance between the first support unit and the second support unit to greater than or equal to a minimum distance.

6. The image display device of claim 5, wherein the stopper extends in the direction and is disposed between the first support unit and the second support unit.

7. The image display device of claim 5, wherein the stopper is fixed to one surface of the second support unit facing the first support unit and comprises a stepped portion having a predetermined height in the direction.

8. The image display device of claim 5, wherein the stopper is disposed on a side surface unit disposed between the first support unit and the second support unit and comprises a locking step extending in a second direction from the one end of the display device to the another end of the display device.

9. The image display device of claim 5, wherein the stopper comprises:
   a plurality of stopper insertion holes, each stopper insertion hole from among the plurality of stopper insertion holes being disposed in a respective side surface unit from among a plurality of side surface units disposed between the first support unit and the second support unit; and
   a plurality of stopper insertion bodies configured to be replaceably disposed in the plurality of stopper insertion holes, each stopper insertion body from among the plurality of stopper insertion bodies comprising a locking step extending in a second direction from the one end of the display device to the another end of the display device,
   wherein each locking step from among the plurality of locking steps is positioned at a respective height in the direction that is different from the heights of each other locking step from among the plurality of locking steps.

10. The image display device of claim 1, wherein the driving unit comprises:
    a driving force applying unit configured to apply the driving force to the display device; and
    a driving signal unit configured to apply a driving signal to the driving force applying unit.

11. The image display device of claim 10, wherein the driving force applying unit comprises a shape memory alloy or an electro active polymer.

12. The image display device of claim 10, wherein the first support unit comprises a first fixing unit configured to fix the driving force applying unit, and
    wherein the second support unit comprises a second fixing unit configured to fix the driving force applying unit.

13. An image displaying device comprising:
    a display device configured to modulate light to form an image;
    a light transmitting unit configured to transmit the image formed by the display device to eyes of a viewer, the light transmitting unit comprising a focusing member;
    a driving unit configured to apply a driving force in one direction over an entire width of the display device perpendicular to the one direction to change a distance between the display device and the light transmitting unit in the one direction;
    a processor configured to control the display device; and a connector disposed between one end of the display device and the processor, the connector connecting the display device to the processor.

14. The image display device of claim 13, further comprising:
a first support unit disposed facing the light transmitting unit and supporting the display device; and
a second support unit separated from the first support unit in the direction at a predetermined interval.

15. The image display device of claim 13, wherein the driving unit comprises:
a driving force applying unit configured to apply the driving force to the display device; and
a driving signal unit configured to apply a driving signal to the driving force applying unit.

16. The image display device of claim 15, wherein the driving force applying unit comprises a shape memory alloy or an electro active polymer.

17. The image display device of claim 16, wherein the driving signal unit is configured to apply a first driving voltage to generate a first driving force by the driving force applying unit and a second driving voltage to generate a second driving force by the driving force applying unit.

18. The image display device of claim 17,
wherein the driving signal unit is configured to apply the first driving force to move the first support unit and the second support unit closer to each other in the direction, and
wherein the driving signal unit is configured to apply the second driving force to separate the first support unit and the second support unit from each other in the direction.

19. The image display device of claim 15, wherein the first support unit comprises a first fixing unit that fixes the driving force applying unit, and
wherein the second support unit comprises a second fixing unit that fixes the driving force applying unit.

20. The image display device of claim 14, further comprising a stopper configured to limit a separation distance between the first support unit and the second support unit to greater than or equal to a minimum distance.

* * * * *